United States Patent [19]
McSherry

[11] 3,913,876
[45] Oct. 21, 1975

[54] CABLE TIE SUPPORT
[75] Inventor: William E. McSherry, Country Club Hills, Ill.
[73] Assignee: Panduit Corporation, Tinley Park, Ill.
[22] Filed: June 10, 1974
[21] Appl. No.: 477,558

Related U.S. Application Data
[63] Continuation of Ser. No. 283,397, Aug. 24, 1972, abandoned.

[52] U.S. Cl.......... 248/74 PB; 24/73 PB; 24/201 A; 248/68 R; 248/73; 248/205 A
[51] Int. Cl.² ........................................... F16L 3/12
[58] Field of Search.... 248/74 PB, 68 R, 73, 205 A, 248/361 A; 24/16 PB, 30.5 P, 73 PB, 201 A

[56] References Cited
UNITED STATES PATENTS

| | | | |
|---|---|---|---|
| 1,369,040 | 2/1921 | Malcolm | 24/201 A |
| 2,712,915 | 7/1955 | Cohen et al. | 24/201 A X |
| 2,961,211 | 11/1960 | Emery | 248/74 PB |
| 2,969,216 | 1/1961 | Hallsey | 248/74 PB X |
| 3,463,427 | 8/1969 | Fisher | 248/74 PB X |
| 3,542,321 | 11/1970 | Kahabka | 248/74 PB X |
| 3,672,615 | 6/1972 | Fiorentino | 248/74 PB |
| 3,731,347 | 5/1973 | Caveney et al. | 24/16 PB |

Primary Examiner—Roy D. Frazier
Assistant Examiner—Rodney H. Bonck
Attorney, Agent, or Firm—Charles R. Wentzel, Esq.; Richard B. Wakely, Esq.

[57] ABSTRACT

A cable tie support has a base including mounting means for securing the support to a mounting surface and cable tie retaining means for releasably retaining a cable tie. Bridge structure extends from the base over an area of perforation in the base to define a strap head opening and strap retaining opening. An entrance portion of the strap retaining opening is wider than the thickness of the strap portion of the cable tie and narrower than the width of the strap portion. Once the cable tie is positioned in an enlarged portion of the strap retaining opening, the configuration of the entrance portion retards movement of the cable tie in a direction away from the support and prevents inadvertent removal of the cable tie from the support.

14 Claims, 9 Drawing Figures

CABLE TIE SUPPORT

This is a continuation of application Ser. No. 283,397, filed Aug. 24, 1972 and now abandoned.

The present invention relates to supports and more particularly to a cable tie support and combination cable tie support and cable tie for positioning a bundle of conductors or the like.

In the past, these supports have comprised a base member having bridge structure extending therefrom as evidenced by U.S. Pat. No. 3,542,321, issued Nov. 24, 1970 to Richard D. Kahabka. One particular limitation of the prior art devices has been the inability to accept more than one size and style of cable tie. Accordingly, it would be desirable to provide a cable tie support adapted to be used with a plurality of sizes and styles of cable ties.

Other prior art cable tie supports rely upon the positioning of the tongue end of the strap through the cable tie head to maintain the cable tie in engagement with the support. It will be appreciated that during assembly such a construction requires the use of one hand to maintain the proper positioning of the cable tie head and another hand to encircle a bundle of conductors or the like with the tongue end of the cable tie. It would be desirable to fabricate a cable tie support wherein a cable tie could be securely positioned therein by utilizing a simple movement of one hand thus permitting freedom of movement of the assembler's other hand to properly position the bundle of conductors.

Accordingly, it is a general object of the present invention to provide a new and improved cable tie support. Another object of the present invention is to provide a cable tie support adapted for use with a plurality of cable ties having various sizes and styles of strap head configuration. An additional object of the present invention is to provide a cable tie support wherein the cable tie can be securely positioned in the cable tie support by means of a simple single hand movement. Yet another object of the present invention is to provide a combination cable tie support and cable tie wherein the support limits movement of the cable tie prior to assembly of the cable tie around a bundle of conductors. Further objects and advantages of the present invention will become apparent as the following description proceeds, and the features of novelty characterizing the invention will be pointed out with particularity in the claims annexed to and forming a part of this specification.

Briefly, the present invention is concerned with a cable tie support having a base including mounting means for securing the support to a mounting surface and cable tie retaining means for releasably retaining a cable tie. The base is perforated with bridge structure extending over the area of perforation to define a strap head opening and strap retaining opening. The strap retaining opening has a restricted entrance portion and an enlarged portion. In order to maintain a cable tie positioned in the support, the entrance portion is wider than the thickness of the strap portion of the cable tie and narrower than the width of the strap portion. Once the cable tie is positioned in the enlarged portion, the configuration of the entrance portion retards movement of the cable tie in a direction away from the support and prevents inadvertent removal of the cable tie from the support. A cable tie is positioned in the enlarged portion by inserting the strap portion laterally through the restricted entrance portion and twisting the strap and strap head while positioning the strap head in the strap head opening.

For a better understanding of the present invention, reference may be had to the accompanying drawings wherein the same reference numerals have been applied to like parts wherein.

Figure 1:
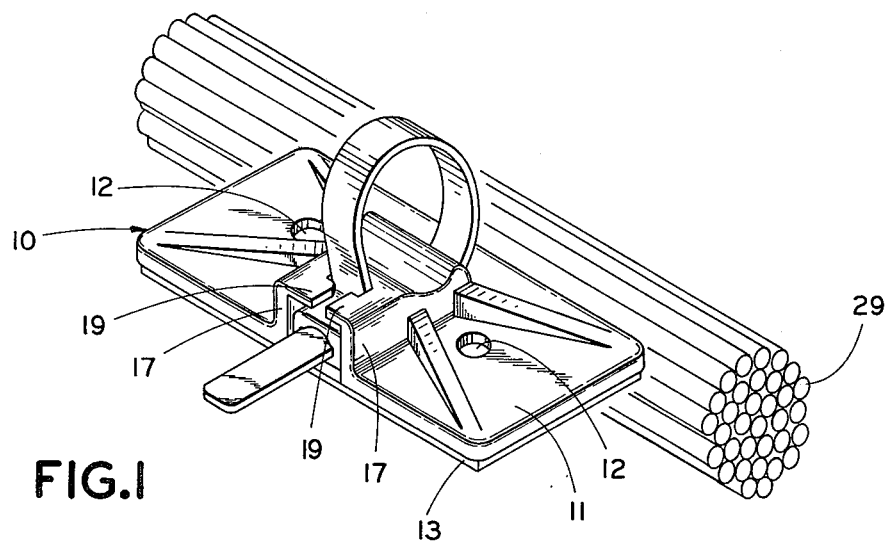
FIG. 1 is a perspective view of a cable tie support built in accord with the present invention with a cable tie positioned therein and disposed adjacent a bundle of conductors.
Figure 2:
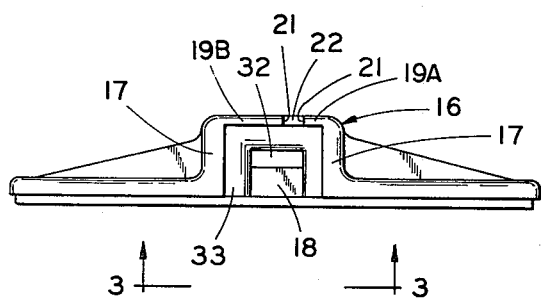
FIG. 2 is a front plan view of a cable tie support built in accord with the present invention.

Referring now to the drawings, the cable tie support is generally indicated at 10 in FIG. 1 and comprises a substantially flat base 11 having mounting means for securing the support to a not shown mounting surface. Any particular mounting means could be utilized. As shown in FIG. 1, either mounting holes 12 for receiving not shown fasteners or pressure-sensitive adhesive tape 13 disposed on the bottom of the base 11 will suffice to secure the support to a mounting surface. Both of these mounting means are well-known and accordingly will not be further discussed. The base 11 is perforated with strap retaining means in the form of bridge structure 16 extending upwardly from the base and over the area of perforation. Cable tie retaining means in the form of a pair of spaced uprights or sidewalls 17 extend upwardly from the front edge of the base and rearwardly therefrom adjacent the area of perforation to define a strap head opening 18. In prior art devices the bridge structure is customarily spaced from the front edge of the base. Frequently, supports of this type are used with cable ties wherein the tongue end of the cable tie is cut off after the cable tie is assembled around a bundle of conductors. In these situations, it is desirable to cut off the tongue end of the cable tie flush, or as flush as possible, with the strap head in order to eliminate the protrusion of the cable tie into the surrounding work space where it could be subjected to inadvertent damaging forces. The present construction having the strap head opening 18 at the front edge of the base 11 makes it possible to bring an assembling tool and its associated cutter blade adjacent the strap head once the cable tie is properly positioned for flush cutoff of the protruding cable tie. At a distance from the top surface of the base, lateral projections 19A and 19B extend from the top of the sidewalls 17 toward one another and terminate in end portions 21 defining a strap retaining opening 22 therebetween. More specifically, projection 19B extends a greater distance from its respective upright than does projection 19A.

Figure 3:
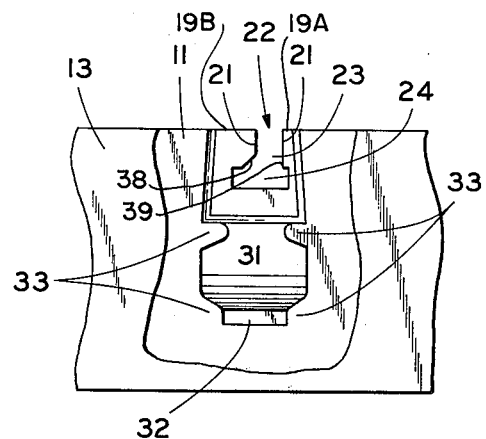
FIG. 3 is a partial bottom view of a cable tie support built in accord with the present invention with parts broken away for clarity.
Figure 4:
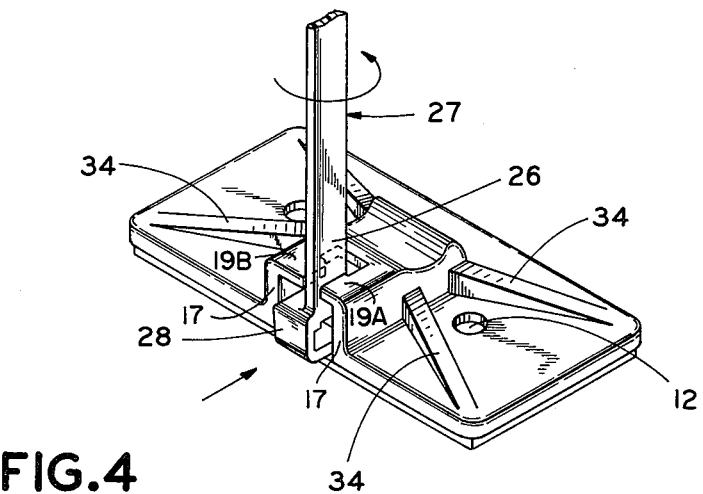
FIG. 4 is a perspective view of a cable tie support built in accord with the present invention showing the manner of positioning the cable tie into the support.
Figure 5:
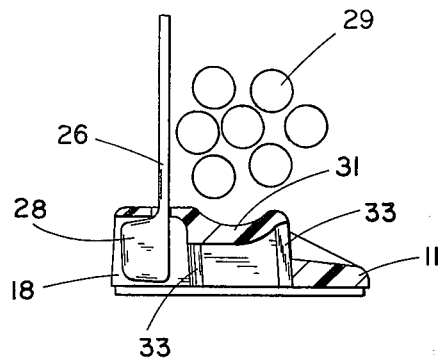
FIG. 5 is a sectional view through a cable tie support built in accord with the present invention showing a cable tie positioned therein and extending adjacent a bundle of conductors.
Figure 6:
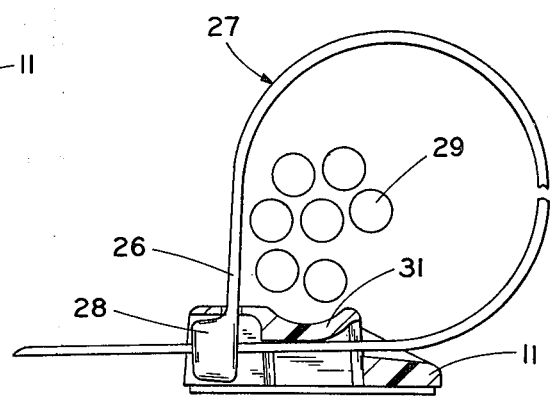
FIG. 6 is a sectional view through a cable tie support built in accord with the present invention showing the cable tie extending through the cable tie head and surrounding a bundle of conductors.

As best shown in FIG. 3, the strap retaining opening 22 comprises a restricted entrance portion 23 and an enlarged portion 24. The entrance portion 23 is wider than the thickness of the strap portion 26 of a cable tie 27 adapted to be used in conjunction with the support 10 and narrower than the width of the strap portion 26. As previously discussed, it is an object of the present invention to provide a cable tie support adaptable for use with a plurality of cable tie sizes and configurations. Accordingly, the specific structure of the cable tie 27 is not shown. For an example of a cable tie usable with the present invention, see U.S. Pat. No. 3,660,869 issued to Jack E. Caveney et al., on May 9, 1972 and assigned to the same assignee as the present invention. As best shown in FIG. 3, the enlarged portion 24 extends laterally toward each of the spaced uprights or sidewalls 17 from the entrance portion 23. Once the strap portion 26 is positioned in the enlarged portion 24, the walls of the entrance portion 23 restrict movement of the cable tie. It should be appreciated that it is relatively simple to position the strap portion 26 with its adjacent strap head 28 into the associated strap retaining opening 22 and strap head opening 18 by inserting the strap laterally between the end portions 21, as shown in FIG. 4, and twisting the strap portion into the enlarged portion 24 while maintaining the strap head 28 in the strap head opening 18. The feature of providing lateral projection 19B extending further than projection 19A requires the cable tie be properly positioned in the support. More particularly, as shown in FIG. 4, the strap entrance face of the locking head of a cable tie generally lies very close to the plane of one surface of the strap portion of the tie with the remainder of the locking head extending as a cantilever from the strap portion and with the strap exit face significantly spaced from the strap portion. Having the difference in lengths of projections 19A and 19B requires that the locking head be properly inserted into opening 22 so that after twisting the strap entrance face of the locking head lies adjacent strap receiving opening 32 of the support. Referring to FIG. 4, if the cable tie were rotated 180° about its longitudinal axis, the cable tie could not easily be inserted into opening 22 because the locking head would abut the right upright 17. This positioning can be readily accomplished utilizing a simple movement of a single hand thereby freeing the assembler's other hand for positioning an associated bundle of conductors 29 or the like adjacent the cable tie support.

As clearly shown in FIG. 3, the part of strap entrance portion 23 adjacent enlarged portion 24 is defined by a pair of opposed sidewalls 38, 39. Sidewall 38 diverges with respect to sidewall 39 to form a progressively wider opening adjacent enlarged portion 24.

Figure 7:
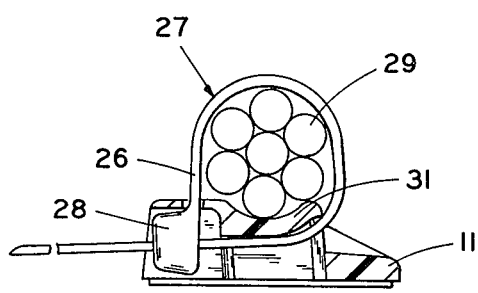
FIG. 7 is a sectional view through a cable tie support built in accord with the present invention showing a cable tie securely positioning a bundle of conductors.

An arcuate saddle 31 extends rearwardly of the strap retaining opening relative to the front edge of the base and bridges the spaced uprights or sidewalls 17. As best shown in FIG. 7, the saddle 31 facilitates the compact positioning of the conductors 29. The rearward edge of the saddle 31 is spaced from the base 11 so as to define an opening 32 to permit the tongue portion of the cable tie to be looped around the bundle of conductors 29 or the like, inserted through the opening 32 and through the strap head 28 to securely lock the cable tie and restrict movement of the associated bundle of conductors. Supporting posts 33 extend upwardly from the base adjacent the channel defined by the inner surface of the spaced uprights to said saddle so as to provide structural support for the bundled conductors and guide means for the positioning of the cable tie tongue portion through the cable tie head. A plurality of ribs 34 extend outwardly from the sidewalls 17 along the base 11 to provide structural reinforcement for the base.

Figure 8:
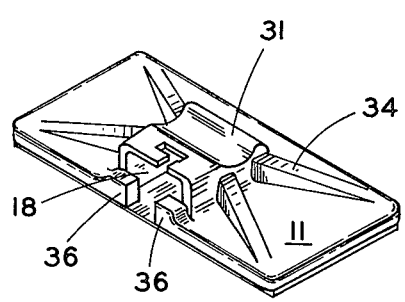
FIG. 8 is a perspective view of an alternative embodiment of the present invention.
Figure 9:
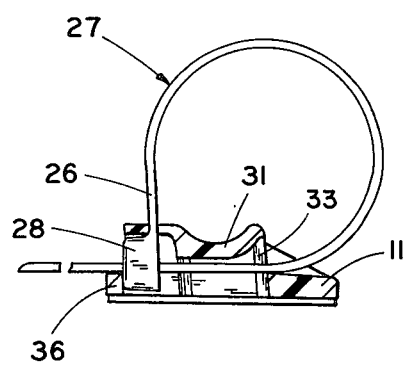
FIG. 9 is a sectional view through the cable tie support of FIG. 8 showing a cable tie securely positioned in the support.

In FIGS. 8 and 9, an alternative embodiment is disclosed wherein a pair of abutments 36 extend along the front edge of the base toward one another to provide a narrow entrance portion for the strap head opening 18. This construction will increase the retaining forces against the strap head 28 once the head has been positioned within the strap head opening 18.

While there has been illustrated what is at present considered to be a preferred embodiment of the present invention and a modification thereof, it will be appreciated that numerous changes or modifications are likely to occur to those skilled in the art and it is intended in the appended claims to cover all those changes and modifications which fall within the true spirit and scope of the present invention.

What is claimed is:

1. A cable tie support comprising a base having mounting means for securing said support to a mounting surface and cable tie retaining means for releasably retaining a cable tie, said cable tie retaining means comprising bridge structure in the form of a pair of spaced uprights extending from said base and defining a strap head opening therebetween, and a lateral projection extending from each of said uprights toward the other of said uprights, each of said projections terminating in an end portion short of said other of said uprights, one of said projections extending a greater distance from its upright than the other said projection extends from its upright, said projections defining a strap retaining opening therebetween, said strap retaining opening having a restricted entrance portion defined by said end portion and an enlarged portion, said entrance portion being wider than the thickness of the strap portion of said cable tie and narrower than the width of said strap portion, said enlarged portion being wider than the width of said strap portion whereby a cable tie is adapted to be positioned in said cable tie retaining means by inserting the strap portion laterally between said projection and the other of said uprights and twisting the strap portion into said enlarged portion while positioning the strap head in said strap head opening.

2. A support as set forth in claim 1 wherein a part of said entrance portion adjacent said enlarged portion is defined by a pair of opposed diverging sidewalls to form a wider opening adjacent the enlarged portion.

3. The cable tie support as defined in claim 1 wherein said base has a front edge, said uprights are in the form of walls extending upwardly from said base at said front edge and rearwardly therefrom to define a channel for positioning the end of a cable tie.

4. The cable tie support as defined in claim 3 wherein a saddle extends between said uprights rearwardly of said strap retaining opening for positioning a bundle of conductors or the like.

5. The cable tie support as defined in claim 4 wherein supporting posts are disposed adjacent said channel and extend from said base to said saddle.

6. The cable tie support as defined in claim 1 wherein said base is perforated with the bridge structure extending over the area of perforation.

7. The cable tie support as defined in claim 1 wherein structural supporting ribs extend from said uprights along said base.

8. The cable tie support as defined in claim 7 wherein said mounting means comprises mounting holes disposed between said ribs.

9. The cable tie support as defined in claim 6 wherein said mounting means comprises pressure-sensitive adhesive tape secured to the bottom of said base, said adhesive tape and said projection being adapted to limit movement of the strap head when the strap head is positioned in said strap head opening.

10. The cable tie support as defined in claim 1 wherein said strap retaining opening extends laterally toward each of said uprights from said entrance portion.

11. In combination, the cable tie support of claim 3 and a cable tie secured thereto, said cable tie comprising a strap portion and a strap head, said strap head being disposed in said strap head opening, said strap portion being disposed in said enlarged portion of said strap retaining opening, said lateral projection restricting movement of said strap head upwardly from said base and forwardly from said front edge, said walls restricting lateral movement of said strap head.

12. The cable tie support as defined in claim 1 wherein an abutment is disposed adjacent each of said pair of spaced uprights, said abutments extending toward one another to restrict the entrance to said strap head opening.

13. A cable tie support comprising a base having mounting means for securing said support to a mounting surface and cable tie retaining means for releasably retaining a cable tie, said cable tie retaining means comprising bridge structure in the form of a pair of spaced uprights extending from said base and defining a strap head opening therebetween, and a lateral projection extending from one of said uprights toward the other of said uprights, said projection terminating in an end portion short of said other of said uprights, said end portion and said other of said uprights defining a strap retaining opening therebetween, said strap retaining opening having a restricted entrance portion and an enlarged portion, said entrance portion being wider than the thickness of the strap portion of said cable tie and narrower than the width of said strap portion, said enlarged portion being wider than the width of said strap portion whereby a cable tie is adapted to be positioned in said cable tie retaining means by inserting the strap portion laterally between said projection and the other of said uprights and twisting the strap portion into said enlarged portion while positioning the strap head in said strap head opening, an abutment being disposed adjacent each of said pair of spaced uprights, said abutments extending toward one another to restrict the entrance to said strap head opening.

14. A cable tie support comprising a base having mounting means for securing said support to a mounting surface and cable tie retaining means for releasably retaining a cable tie, said cable tie retaining means comprising bridge structure in the form of a pair of spaced uprights extending from said base and defining a strap head opening therebetween, and a lateral projection extending from one of said uprights toward the other of said uprights, said projection terminating in an end portion short of said other of said uprights, said end portion and said other of said uprights defining a strap retaining opening therebetween, said strap retaining opening having a restricted entrance portion and an enlarged portion, said entrance portion being wider than the thickness of the strap portion of said cable tie and narrower than the width of said strap portion, said enlarged portion being wider than the width of said strap portion whereby a cable tie is adapted to be positioned in said cable tie retaining means by inserting the strap portion laterally between said projection and the other of said uprights and twisting the strap portion into said enlarged portion while positioning the strap head in said strap head opening, said base having a front edge, said uprights being in the form of walls extending upwardly from said base at said front edge and rearwardly therefrom to define a channel for positioning the end of a cable tie, a saddle extending between said uprights rearwardly of said strap retaining opening for positioning a bundle of conductors or the like, supporting posts being disposed adjacent said channel and extending from said base to said saddle.

* * * * *